(12) United States Patent
Tanaka et al.

(10) Patent No.: US 11,114,215 B2
(45) Date of Patent: *Sep. 7, 2021

(54) CORE ELECTRIC WIRE FOR MULTI-CORE CABLE AND MULTI-CORE CABLE

(71) Applicant: SUMITOMO ELECTRIC INDUSTRIES, LTD., Osaka (JP)

(72) Inventors: Shigeyuki Tanaka, Osaka (JP); Shinya Nishikawa, Osaka (JP); Hiroyuki Okawa, Kanuma (JP); Takaya Kohori, Kanuma (JP); Yuhei Mayama, Kanuma (JP); Takayuki Hirai, Kanuma (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,419

(22) Filed: Jan. 29, 2019

(65) Prior Publication Data

US 2019/0198193 A1 Jun. 27, 2019

Related U.S. Application Data

(63) Continuation-in-part of application No. 15/904,720, filed on Feb. 26, 2018, now Pat. No. 10,418,150, (Continued)

(51) Int. Cl.
*H01B 7/00* (2006.01)
*H01B 3/44* (2006.01)
(Continued)

(52) U.S. Cl.
CPC ........... *H01B 7/0009* (2013.01); *H01B 3/441* (2013.01); *H01B 3/447* (2013.01); *H01B 3/448* (2013.01);
(Continued)

(58) Field of Classification Search
CPC .... H02G 1/14; H02G 3/0418; H02G 15/1833; H01B 17/58
(Continued)

(56) References Cited

U.S. PATENT DOCUMENTS 7,476,114 B1 * 1/2009 Contreras ................ H01R 4/70
439/201
9,224,519 B2 * 12/2015 McLaughlin ...... H02G 15/1826
(Continued)

FOREIGN PATENT DOCUMENTS

| CN | 101819832 A | 9/2010 |
|---|---|---|
| CN | 102867598 A | 1/2013 |

(Continued)

OTHER PUBLICATIONS

Notice of Allowance dated May 20, 2019 that issued in U.S. Appl. No. 15/904,720.
(Continued)

*Primary Examiner* — Timothy J Thompson
*Assistant Examiner* — Amol H Patel
(74) *Attorney, Agent, or Firm* — Faegre Drinker Biddle & Reath LLP

(57) ABSTRACT

An object of the present disclosure is to provide a core electric wire for a multi-core cable that is superior in flex resistance at low temperature, and a multi-core cable employing the same. A core electric wire for a multi-core cable according to an aspect of the present disclosure comprises a conductor obtained by twisting element wires, and an insulating layer covering the conductor, wherein a linear expansion coefficient C of the insulating layer at from 25° C. to −35° C. is no less than $1\times10^{-5}$ $K^{-1}$ and no greater than $2.5\times10^{-4}$ $K^{-1}$.

21 Claims, 6 Drawing Sheets

Related U.S. Application Data which is a continuation of application No. 15/517,640, filed as application No. PCT/JP2015/077881 on Sep. 30, 2015, now Pat. No. 9,928,937.

(51) Int. Cl.
  *H01B 7/295* (2006.01)
  *H01B 7/02* (2006.01)
  *H01B 7/28* (2006.01)

(52) U.S. Cl.
  CPC ............... *H01B 7/02* (2013.01); *H01B 7/28* (2013.01); *H01B 7/295* (2013.01)

(58) Field of Classification Search
  USPC .......................................................... 174/93
  See application file for complete search history.

(56) References Cited

U.S. PATENT DOCUMENTS

| | | | |
|---|---|---|---|
| 9,928,937 B2 | 3/2018 | Tanaka et al. | |
| 10,176,908 B2 | 1/2019 | Tanaka et al. | |
| 2003/0215198 A1* | 11/2003 | Newton | G02B 6/4494 385/113 |
| 2010/0012350 A1* | 1/2010 | Hardi | H02G 15/1826 174/135 |
| 2010/0212933 A1 | 8/2010 | Hayashishita et al. | |
| 2012/0205136 A1 | 8/2012 | Moriuchi et al. | |
| 2012/0261161 A1* | 10/2012 | Kelley | H01B 7/04 174/120 R |
| 2013/0012396 A1* | 1/2013 | Masaki | H01B 3/46 505/230 |
| 2013/0280532 A1 | 10/2013 | Balfour et al. | |
| 2014/0190741 A1 | 7/2014 | Hayakawa | |
| 2014/0234619 A1 | 8/2014 | Shan | |
| 2014/0326480 A1 | 11/2014 | Hashimoto et al. | |

FOREIGN PATENT DOCUMENTS

| | | | | |
|---|---|---|---|---|
| CN | 103050186 A | * | 4/2013 | |
| CN | 103559954 A | | 2/2014 | |
| CN | 203673848 U | | 6/2014 | |
| CN | 103994924 A | | 8/2014 | |
| JP | S50-23747 | | 8/1975 | |
| JP | 2003-303515 A | | 10/2003 | |
| JP | 2010-198973 A | | 9/2010 | |
| JP | 2011-99084 A | | 5/2011 | |
| JP | 2014-135153 A | | 7/2014 | |
| JP | 2014-220043 A | | 11/2014 | |
| JP | 2015-156386 A | | 8/2015 | |
| WO | WO-2009137013 A1 | * | 11/2009 | ............... H01R 4/70 |
| WO | WO-2017/056278 A1 | | 4/2017 | |

OTHER PUBLICATIONS

Office Action dated Jan. 18, 2019 that issued in U.S. Appl. No. 16/155,308.
Notice of Allowance dated Jan. 4, 2019 that issued in U.S. Appl. No. 15/904,720.
Notice of Allowance dated Jan. 9, 2019 that issued in U.S. Appl. No. 16/155,216.
Notice of Allowance dated Apr. 4, 2019 that issued in U.S. Appl. No. 16/155,308.
Notice of Allowance dated Apr. 10, 2019 that issued in U.S. Appl. No. 16/155,216.
U.S. Office Action dated Oct. 6, 2017 that issued in U.S. Appl. No. 15/517,615.
U.S. Final Office Action dated May 18, 2018 that issued in U.S. Appl. No. 15/517,615.
CN Office Action dated Oct. 8, 2019 in Chinese Application No. 201910492119.8 (with attached English-language translation).
CN Office Action dated Nov. 6, 2019 in Chinese Application No. 201910493154.1 (with attached English-language translation).
Notice of Allowance dated Feb. 5, 2020 in U.S. Appl. No. 16/453,536.
Notice of Allowance dated Feb. 5, 2020 in U.S. Appl. No. 16/453,661.
CN Office Action dated Mar. 30, 2020 in Chinese Application No. 2019104931522 (with attached English-language translation).
Chinese handbook ("Technology and Application of Cable Technology") edited by Weidong WANG, China Machine Press, Aug. 2014, pp. 116-119.
JP Office Action dated Sep. 1, 2020 from corresponding Japanese patent application No. 2018-009914 (with attached English-language translation).
Notice of Allowance dated Dec. 8, 2020 that issued in U.S. Appl. No. 16/862,904.

* cited by examiner

CORE ELECTRIC WIRE FOR MULTI-CORE CABLE AND MULTI-CORE CABLE

CROSS-REFERENCE TO RELATED APPLICATIONS

This application is a continuation-in-part of copending U.S. patent application Ser. No. 15/904,720, filed Feb. 26, 2018, which is a continuation of U.S. patent application Ser. No. 15/517,640 (now U.S. Pat. No. 9,928,937, issued Mar. 27, 2018), filed on Apr. 7, 2017, which is a § 371 of International Application No. PCT/JP2015/077881, filed Sep. 30, 2015, the entire contents each of which are incorporated herein by reference.

TECHNICAL FIELD

The present disclosure relates to a core electric wire for a multi-core cable and to a multi-core cable.

BACKGROUND ART

A sensor used for an ABS (Anti-lock Brake System), etc. in a vehicle, and an actuator used for an electric parking brake, etc. are connected to a control unit via a cable. As the cable, a cable provided with: a core member (core) obtained by twisting insulated electric wires (core electric wires); and a sheath layer that covers the core member is generally used (refer to Japanese Unexamined Patent Application, Publication No. 2015-156386).

The cable connected to the ABS, the electric parking brake, etc. is intricately bent to be laid out within the vehicle and in accordance with drive of an actuator. In addition, the cable may be exposed to a low temperature of 0° C. or below, depending on a use environment.

PRIOR ART DOCUMENTS

Patent Documents

Patent Document 1: Japanese Unexamined Patent Application, Publication No. 2015-156386

SUMMARY OF THE INVENTION

Problems to be Solved by the Invention

In such a conventional cable, polyethylene is generally used for an insulating layer of the insulated electric wire composing the core in light of insulation properties; however, the cable in which polyethylene is used for an insulating layer is prone to breakage upon bending at low temperature. Therefore, improvement of flex resistance at low temperature is required.

The present disclosure was made in view of the foregoing circumstances, and an object of the present disclosure is to provide a core electric wire for a multi-core cable that is superior in flex resistance at low temperature, and a multi-core cable employing the same.

Means for Solving the Problems

A core electric wire for a multi-core cable according to an aspect of the present disclosure made for solving the aforementioned problems comprises a conductor obtained by twisting element wires, and an insulating layer that covers an outer periphery of the conductor, in which a linear expansion coefficient C of the insulating layer at from 25° C. to −35° C. is no less than $1\times10^{-5}$ $K^{-1}$ and no greater than $2.5\times10^{-4}$ $K^{-1}$.

A core electric wire for a multi-core cable according to an aspect of the present disclosure made for solving the aforementioned problems comprises: a conductor obtained by twisting element wires; and an insulating layer that covers an outer periphery of the conductor, in which a modulus of elasticity E of the insulating layer at −35° C. is no less than 1,000 MPa and no greater than 3,500 MPa.

A core electric wire for a multi-core cable according to an aspect of the present disclosure made for solving the aforementioned problems comprises: a conductor obtained by twisting element wires; and an insulating layer that covers an outer periphery of the conductor, wherein the number of times of bending of the multi-core cable, counted according to a flex test is no less than 10,000, the flex test comprising: placing the multi-core cable perpendicularly between a first mandrel and a second mandrel each having a diameter of 60 mm arranged horizontally and parallel to each other; repeatedly bending the multi-core cable from side to side at 90° in a horizontal direction such that an upper end thereof is in contact with an upper side of the first mandrel and then in contact with an upper side of the second mandrel; and counting the number of times of bending until a breakage of the multi-core cable (a state unable to carry a current), under a test condition involving: a downward load of 2 kg applied to a lower end of the multi-core cable; a temperature of −30° C.; and a bending rate of 60 times/min.

Effects of the Invention

The core electric wire for a multi-core cable and a multi-core cable according to aspects of the present disclosure are superior in flex resistance at low temperature.

DESCRIPTION OF EMBODIMENTS

Description of Embodiments of Present Invention

Figure 1:
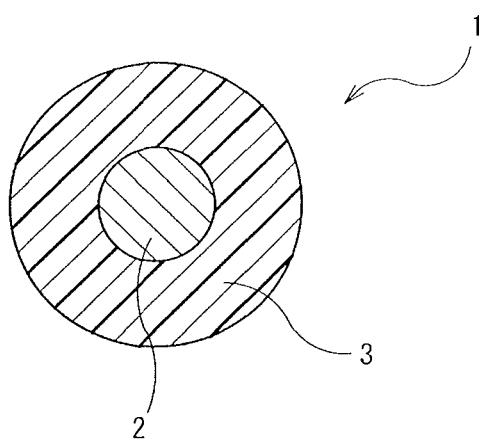
FIG. 1 is a schematic transverse cross sectional view illustrating a core electric wire for a multi-core cable according to a first embodiment of the present disclosure.

A core electric wire for a multi-core cable according to an aspect of the present disclosure comprises a conductor obtained by twisting element wires, and an insulating layer that covers an outer periphery of the conductor, in which a linear expansion coefficient C of the insulating layer at from 25° C. to −35° C. is no less than $1\times10^{-1}$ $K^{-1}$ and no greater than $2.5\times10^{-4}$ $K^{-1}$.

A core electric wire for a multi-core cable according to an aspect of the present disclosure made for solving the aforementioned problems comprises: a conductor obtained by twisting element wires; and an insulating layer that covers an outer periphery of the conductor, in which a modulus of elasticity E of the insulating layer at −35° C. is no less than 1,000 MPa and no greater than 3,500 MPa.

A core electric wire for a multi-core cable according to an aspect of the present comprises: a conductor obtained by twisting element wires; and an insulating layer that covers an outer periphery of the conductor, wherein the number of times of bending of the multi-core cable, counted according to a flex test is no less than 10,000, the flex test comprising: placing the multi-core cable perpendicularly between a first mandrel and a second mandrel each having a diameter of 60 mm arranged horizontally and parallel to each other; repeatedly bending the multi-core cable from side to side at 90° in a horizontal direction such that an upper end thereof is in contact with an upper side of the first mandrel and then in contact with an upper side of the second mandrel; and counting the number of times of bending until a breakage of the multi-core cable (a state unable to carry a current), under a test condition involving: a downward load of 2 kg applied to a lower end of the multi-core cable; a temperature of −30° C.; and a bending rate of 60 times/min.

The core electric wire for a multi-core cable, in which the product of the linear expansion coefficient of the insulating layer and the modulus of elasticity thereof at low temperature falls within the above range, exerts comparatively superior flex resistance at low temperature. A mechanism for this effect is envisaged to involve that: when at least one of the linear expansion coefficient and the modulus of elasticity at low temperature is comparatively small, hardening (decrease in flexibility) due to shrinkage of the insulating layer at low temperature is inhibited, whereby the flex resistance at low temperature is improved. It is to be noted that the "linear expansion coefficient" as referred to means a linear expansion rate measured in accordance with a method of determination of dynamic mechanical properties defined in JIS-K7244-4 (1999), which is a value calculated from a dimension change of a thin plate with a temperature change using a viscoelasticity measuring apparatus (e.g., "DVA-220" manufactured by IT KEISOKU SEIGYO K.K.), in a pulling mode under conditions of: a temperature range of −100° C. to 200° C.; a rate of temperature rise of 5° C./min; a frequency of 10 Hz; and a skew of 0.05%. The "modulus of elasticity" as referred to means a value measured in accordance with a method of determination of dynamic mechanical properties defined in JIS-K7244-4 (1999), which is a value of storage elastic modulus measured by using a viscoelasticity measuring apparatus (e.g., "DVA-220" manufactured by IT KEISOKU SEIGYO K.K.), in a pulling mode under conditions of: a temperature range of −100° C. to 200° C.; a rate of temperature rise of 5° C./min; a frequency of 10 Hz; and a skew of 0.05%. In addition, "flex resistance" as referred to means a performance of preventing a breakage from occurring in a conductor even after repeated bending of an electric wire or a cable.

A principal component of the insulating layer is preferably polyethylene (PE), polyvinyl chloride (PVC), a copolymer of ethylene and an α-olefin having a carbonyl group, or a combination thereof. In the case in which these resins are used as the principal component, development of an effect of improving flex resistance can be promoted.

An average area of the transverse cross section of the conductor is preferably no less than 1.0 mm$^2$ and no greater than 3.0 mm$^2$. In the case of the transverse cross sectional area of the conductor falling within the above range, the core electric wire for a multi-core cable can be suitably used for a multi-core cable for vehicle.

An average diameter of the element wires in the conductor is preferably no less than 40 μm and no greater than 100 μm, and number of the element wires is preferably no less than 196 and no greater than 2,450. In the case of the average diameter and the number of the element wires falling within the above ranges, development of an effect of improving flex resistance at low temperature can be promoted.

It is preferred that the conductor is obtained by twisting a plurality of stranded element wires, the stranded element wire being obtained by twisting subsets of the element wires. Employing such a conductor (twisted strand wire) obtained by twisting stranded element wires obtained by twisting subsets of element wires enables promotion of development of an effect of improving flex resistance of the electric wire for a multi-core cable.

A multi-core cable according to another aspect of the present disclosure comprises a core obtained by twisting core electric wires, and a sheath layer disposed around the core, in which at least one of the core electric wires is the core electric wire for a multi-core cable of the aforementioned aspect.

By virtue of being provided with the core electric wire for a multi-core cable of the aforementioned aspect as the electric wire constituting the core, the multi-core cable is superior in flex resistance at low temperature.

It is preferred that at least one of the core electric wires is obtained by twisting subsets of the core electric wires. In the case of the core thus comprising the stranded core electric wire, application of the multi-core cable can be expanded while maintaining flex resistance.

Details of Embodiments of Present Invention

The core electric wire for a multi-core cable and the multi-core cable according to embodiments of the present disclosure are described in detail hereinafter with reference to the drawings.

First Embodiment

The core electric wire for a multi-core cable 1 illustrated in FIG. 1 is an insulated electric wire to be used in a multi-core cable which comprises a core and a sheath layer disposed around the core, the core being formed by twisting core electric wires 1. The core electric wire for a multi-core cable 1 comprises a linear conductor 2 and an insulating layer 3, which is a protective layer, that covers an outer periphery of the conductor 2.

A transverse cross-sectional shape of the core electric wire for a multi-core cable 1 is not particularly limited and may be, for example, a circular shape. In the case in which the transverse cross-sectional shape of the core electric wire for a multi-core cable 1 is a circular shape, an average external diameter thereof varies according to an intended use and may be, for example, no less than 1 mm and no greater than 10 mm.

<Conductor>

The conductor 2 is formed by twisting element wires at a constant pitch. The element wire is not particularly limited and examples thereof include a copper wire, a copper alloy wire, an aluminum wire, an aluminum alloy wire, and the like. The conductor 2 employs a stranded element wire obtained by twisting element wires, and is preferably a twisted strand wire obtained by further twisting stranded element wires. The stranded element wires to be twisted each preferably have the same number of element wires being twisted.

The number of element wires is appropriately determined in accordance with an intended use of the multi-core cable and a diameter of each element wire, and the lower limit is preferably 196 and more preferably 294. Meanwhile, the upper limit of the number of the element wires is preferably 2,450 and more preferably 2,000. Examples of the twisted strand wire include: a twisted strand wire, having 196 element wires in total, obtained by twisting 7 stranded element wires each obtained by twisting 28 element wires; a twisted strand wire, having 294 element wires in total, obtained by twisting 7 stranded element wires each obtained by twisting 42 element wires; a twisted strand wire, having 380 element wires in total, obtained by twisting 19 stranded element wires each obtained by twisting 20 element wires; a twisted strand wire, having 1,568 element wires in total, obtained by twisting 7 secondary stranded element wires each having 224 element wires, obtained by twisting 7 primary stranded element wires each obtained by twisting 32 element wires; and a twisted strand wire, having 2, 450 element wires in total, obtained by twisting 7 secondary stranded element wires each having 350 element wires, obtained by twisting 7 primary stranded element wires each obtained by twisting 50 element wires; and the like.

The lower limit of an average diameter of the element wire is preferably 40 μm, more preferably 50 μm, and further more preferably 60 μm. Meanwhile, the upper limit of the average diameter of the element wire is preferably 100 μm and more preferably 90 μm. In the case of the average diameter of the element wire being less than the lower limit or being greater than the upper limit, the effect of improving flex resistance of the core electric wire for a multi-core cable 1 may not be sufficiently provided.

The lower limit of an average area of the transverse cross section of the conductor 2 (including the voids among the element wires) is preferably 1.0 mm², more preferably 1.5 mm², further more preferably 1.8 mm², and yet more preferably 2.0 mm². Meanwhile, the upper limit of the average area of the transverse cross section of the conductor 2 is preferably 3.0 mm² and more preferably 2.8 mm². In the case of the average area of the transverse cross section of the conductor 2 falling within the above range, the core electric wire for a multi-core cable 1 can be suitably used for a multi-core cable for vehicle.

<Insulating Layer>

The insulating layer 3 is formed from a composition comprising a synthetic resin as a principal component, and is laminated around an outer periphery of the conductor 2 so as to cover the conductor 2. An average thickness of the insulating layer 3 is not particularly limited and may be, for example, no less than 0.1 mm and no greater than 5 mm. The "average thickness" as referred to means an average value of thicknesses measured at arbitrary 10 positions. It is to be noted that the expression "average thickness" used hereinafter for another member, etc. has the same definition.

A principal component of the insulating layer 3 is exemplified by polyethylene (PE), polyvinyl chloride (PVC), a copolymer of ethylene and an α-olefin having a carbonyl group, and the like. The "principal component" as referred to herein means a component contained in the highest proportion, and refers to a component present in a proportion of, for example, no less than 50% by mass. Examples of PE include high-density polyethylene (HDPE), low-density polyethylene (LDPE), and very low-density polyethylene (VLDPE). When the copolymer of ethylene and an α-olefin having a carbonyl group is used for the insulating layer, the lower limit of the content of the α-olefin having a carbonyl group is preferably 14% by mass and more preferably 15% by mass. Meanwhile, the upper limit of the content of the α-olefin having a carbonyl group is preferably 46% by mass and more preferably 30% by mass. In the case of the content of the α-olefin having a carbonyl group being less than the lower limit, the effect of improving the flex resistance at low temperature may be insufficient. To the contrary, in the case of the content of the α-olefin having a carbonyl group being greater than the upper limit, mechanical properties such as strength of the insulating layer 3 may be inferior.

Examples of the α-olefin having a carbonyl group include: alkyl (meth)acrylates such as methyl (meth)acrylate and ethyl (meth)acrylate; aryl (meth)acrylates such as phenyl (meth)acrylate; vinyl esters such as vinyl acetate and vinyl propionate; unsaturated acids such as (meth) acrylic acid, crotonic acid, maleic acid, and itaconic acid; vinyl ketones such as methyl vinyl ketone and phenyl vinyl ketone; (meth)acrylic acid amides; and the like. Of these, alkyl (meth)acrylates and vinyl esters are preferred; and ethyl acrylate and vinyl acetate are more preferred.

Examples of the copolymer of ethylene and an α-olefin having a carbonyl group include resins such as an ethylene-vinyl acetate copolymer (EVA), an ethylene-ethyl acrylate copolymer (EEA), an ethylene-methyl acrylate copolymer (EMA) and an ethylene-butyl acrylate copolymer (EBA), among which EVA and EEA are preferred.

The lower limit of a mathematical product C*E is 0.01, wherein C is a linear expansion coefficient of the insulating layer 3 at from 25° C. to −35° C., and E is a modulus of elasticity at −35° C. Meanwhile, the upper limit of the mathematical product C*E is 0.9, preferably 0.7, and more preferably 0.6. In the case of the mathematical product C*E being less than the lower limit, the mechanical properties such as strength of the insulating layer 3 may be insufficient. To the contrary, in the case of the mathematical product C*E being greater than the upper limit, the insulating layer 3 is less likely to deform at low temperature, whereby the flex resistance of the core electric wire for a multi-core cable 1 at low temperature may be decreased. It is to be noted that the mathematical product C*E can be adjusted by the content of the α-olefin, the proportion of the principal component resin contained, and the like.

The lower limit of the linear expansion coefficient C of the insulating layer 3 at from 25° C. to −35° C. is preferably $1 \times 10^{-5} K^{-1}$, and more preferably $1 \times 10^{-4} K^{-1}$. Meanwhile, the upper limit of the linear expansion coefficient C of the insulating layer 3 is preferably $2.5 \times 10^{-4} K^{-1}$, and more preferably $2 \times 10^{-4} K^{-1}$. In the case of the linear expansion coefficient C being less than the lower limit, the mechanical properties such as strength of the insulating layer 3 may be insufficient. To the contrary, in the case of the linear expansion coefficient C of the insulating layer 3 being greater than the upper limit, the insulating layer 3 is less likely to deform at low temperature, whereby the flex resistance of the core electric wire for a multi-core cable 1 at low temperature may be decreased.

The lower limit of the modulus of elasticity E of the insulating layer 3 at −35° C. is preferably 1,000 MPa and more preferably 2,000 MPa. Meanwhile, the upper limit of the modulus of elasticity E of the insulating layer 3 is preferably 3,500 MPa and more preferably 3,000 MPa. In the case of the modulus of elasticity E of the insulating layer 3 being less than the lower limit, the mechanical properties such as strength of the insulating layer 3 may be insufficient. To the contrary, in the case of the modulus of elasticity E of the insulating layer 3 being greater than the upper limit, the insulating layer 3 is less likely to deform at low temperature, whereby the flex resistance of the core electric wire for a multi-core cable 1 at low temperature may be decreased.

The insulating layer 3 may contain an additive such as a fire retardant, an auxiliary flame retardant agent, an antioxidant, a lubricant, a colorant, a reflection imparting agent, a masking agent, a processing stabilizer, a plasticizer, and the like. The insulating layer 3 may also contain an additional resin other than the aforementioned principal component resin.

The upper limit of the content of the additional resin is preferably 50% by mass, more preferably 30% by mass, and further more preferably 10% by mass. Alternatively, the insulating layer 3 may contain substantially no additional resin.

Examples of the fire retardant include: halogen-based fire retardants such as a bromine-based fire retardant and a chlorine-based fire retardant; non-halogen-based fire retardants such as metal hydroxide, a nitrogen-based fire retardant, a phosphorus-based fire retardant; and the like. These fire retardants may be used either alone of one type, or in combination of two or more types thereof.

Examples of the bromine-based fire retardant include decabromo diphenylethane and the like. Examples of the chlorine-based fire retardant include chlorinated paraffin, chlorinated polyethylene, chlorinated polyphenol, perchloropentacyclodecane, and the like. Examples of the metal hydroxide include magnesium hydroxide, aluminum hydroxide, and the like. Examples of the nitrogen-based fire retardant include melamine cyanurate, triazine, isocyanurate, urea, guanidine, and the like. Examples of the phosphorus-based fire retardant include a metal phosphinate, phosphaphenanthrene, melamine phosphate, ammonium phosphate, ester phosphate, polyphosphazene, and the like.

As the fire retardant, the non-halogen-based fire retardant is preferred, and the metal hydroxide, the nitrogen-based fire retardant, and the phosphorus-based fire retardant are more preferred, in light of reduction of environmental load.

The lower limit of the content of the fire retardant in the insulating layer 3 is preferably 10 parts by mass, and more preferably 50 parts by mass, with respect to 100 parts by mass of a resin component. Meanwhile, the upper limit of the content of the fire retardant is preferably 200 parts by mass and more preferably 130 parts by mass. In the case of the content of the fire retardant being less than the lower limit, a fire retarding effect may not be sufficiently imparted. To the contrary, in the case of the content of the fire retardant being greater than the upper limit, extrusion moldability of the insulating layer 3 may be impaired, and mechanical properties such as extension and tensile strength may be impaired.

In the insulating layer 3, the resin component is preferably crosslinked. Examples of a procedure of crosslinking the resin component of the insulating layer 3 include: a procedure of irradiating with an ionizing radiation; a procedure of using a thermal crosslinking agent; a procedure of using a silane graftmer; and the like, and the procedure of irradiating with an ionizing radiation is preferred. In addition, in order to promote crosslinking, it is preferred to add a silane coupling agent to a composition for forming the insulating layer 3.

<Production Method of Core Electric Wire for Multi-Core Cable>

The core electric wire for a multi-core cable 1 can be obtained by a production method mainly comprising a step of twisting element wires (twisting step), and a step of forming the insulating layer 3 that covers an outer periphery of the conductor 2 obtained by twisting the element wires (insulating layer forming step).

Examples of a procedure of covering the outer periphery of the conductor 2 with the insulating layer 3 include a procedure of extruding a composition for forming the insulating layer 3 to the outer periphery of the conductor 2.

It is preferred that the production method of the core electric wire for a multi-core cable 1 further comprises a step of crosslinking the resin component of the insulating layer 3 (crosslinking step). The crosslinking step may take place either prior to covering the conductor 2 with the composition for forming the insulating layer 3, or subsequent to the covering (formation of the insulating layer 3).

The crosslinking can be caused by irradiating the composition with an ionizing radiation. As the ionizing radiation, for example, a γ-ray, an electron beam, an X-ray, a neutron ray, a high-energy ion beam, and the like may be employed. The lower limit of the irradiation dose of the ionizing radiation is preferably 10 kGy, and more preferably 30 kGy. Meanwhile, the upper limit of the irradiation dose of the ionizing radiation is preferably 300 kGy and more preferably 240 kGy. In the case of the irradiation dose being less than the lower limit, a crosslinking reaction may not proceed sufficiently. To the contrary, in the case of the irradiation dose being greater than the upper limit, the resin component may be degraded.

<Advantages>

According to the core electric wire for a multi-core cable 1, since at least one of the linear expansion coefficient and the modulus of elasticity at low temperature is comparatively small, hardening (decrease in flexibility) due to shrinkage of the insulating layer at low temperature is inhibited, whereby the flex resistance at low temperature is improved while maintaining insulation properties.

Second Embodiment

Figure 2:
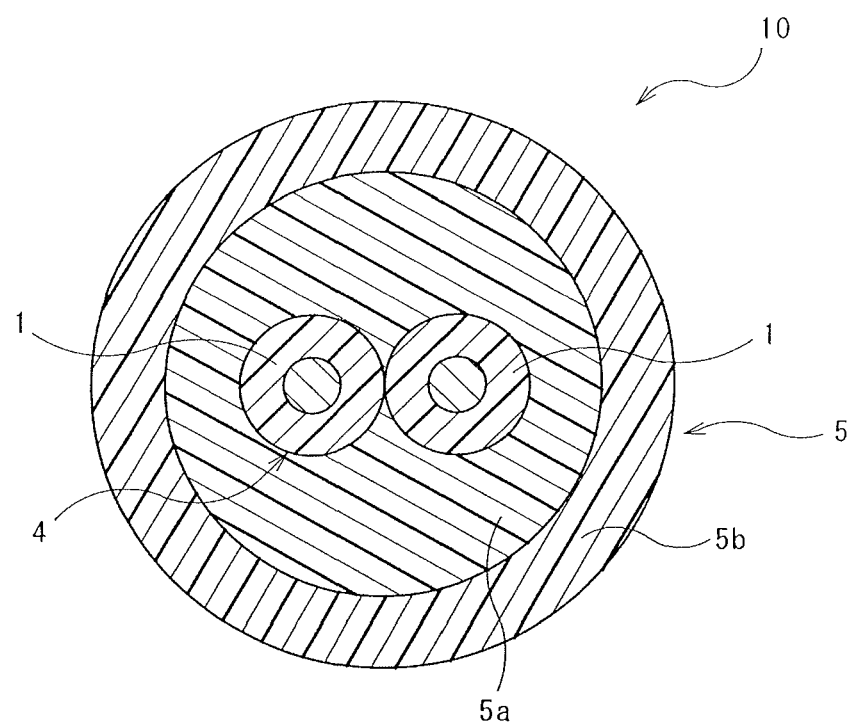
FIG. 2 is a schematic transverse cross sectional view illustrating a multi-core wire according to a second embodiment of the present disclosure.

A multi-core cable 10 illustrated in FIG. 2 comprises a core 4 obtained by twisting a plurality of the core electric wires for a multi-core cable 1 of FIG. 1, and a sheath layer 5 disposed around the core 4. The sheath layer 5 has an inner sheath layer 5a (interlayer) and an outer sheath layer 5b (outer coat). The multi-core cable 10 can be suitably used as a cable for transmitting an electric signal to a motor that drives a brake caliper of an electrical parking brake.

An external diameter of the multi-core cable 10 is appropriately determined in accordance with an intended use. The lower limit of the external diameter is preferably 6 mm and more preferably 8 mm. Meanwhile, the upper limit of the external diameter of the multi-core cable 10 is preferably 16 mm, more preferably 14 mm, further more preferably 12 mm, and particularly preferably 10 mm.

<Core>

The core 4 is formed by pair-twisting two core electric wires for a multi-core cable 1 of the same diameter. The core electric wire for a multi-core cable 1 has the conductor 2 and the insulating layer 3 as described in the foregoing.

<Sheath Layer>

The sheath layer 5 has a two-layer structure with the inner sheath layer 5a that is laminated around an outer side of the core 4, and the outer sheath layer 5b that is laminated around an outer periphery of the inner sheath layer 5a.

A principal component of the inner sheath layer 5a is not particularly limited as long as it is a flexible synthetic resin, and examples thereof include: polyolefins such as polyethylene and EVA; polyurethane elastomers; polyester elastomers; and the like. These may be used in mixture of two or more types thereof.

The lower limit of a minimum thickness of the inner sheath layer 5a (minimum distance between the core 4 and the outer periphery of the inner sheath layer 5a) is preferably 0.3 mm and more preferably 0.4 mm. Meanwhile, the upper limit of the minimum thickness of the inner sheath layer 5a is preferably 0.9 mm and more preferably 0.8 mm. The lower limit of an external diameter of the inner sheath layer 5a is preferably 6.0 mm and more preferably 7.3 mm. Meanwhile, the upper limit of the external diameter of the inner sheath layer 5a is preferably 10 mm and more preferably 9.3 mm.

A principal component of the outer sheath layer 5b is not particularly limited as long as it is a synthetic resin superior in flame retardance and abrasion resistance, and examples thereof include a polyurethane and the like.

An average thickness of the outer sheath layer 5b is preferably no less than 0.3 mm and no greater than 0.7 mm.

In the inner sheath layer 5a and the outer sheath layer 5b, respective resin components are preferably crosslinked. A crosslinking procedure for the inner sheath layer 5a and the outer sheath layer 5b may be similar to the crosslinking procedure for the insulating layer 3.

In addition, the inner sheath layer 5a and the outer sheath layer 5b may contain an additive exemplified for the insulating layer 3.

It is to be noted that a tape member such as a paper tape may be wrapped around the core 4 as an anti-twist member between the sheath layer 5 and the core 4.

<Production Method of Multi-Core Cable>

The multi-core cable 10 can be obtained by a production method comprising a step of twisting a plurality of the core electric wires for a multi-core cable 1 (twisting step), and a step of covering with the sheath layer an outer side of the core 4 obtained by twisting the plurality of core electric wires for a multi-core cable 1 (sheath layer application step).

Figure 3:
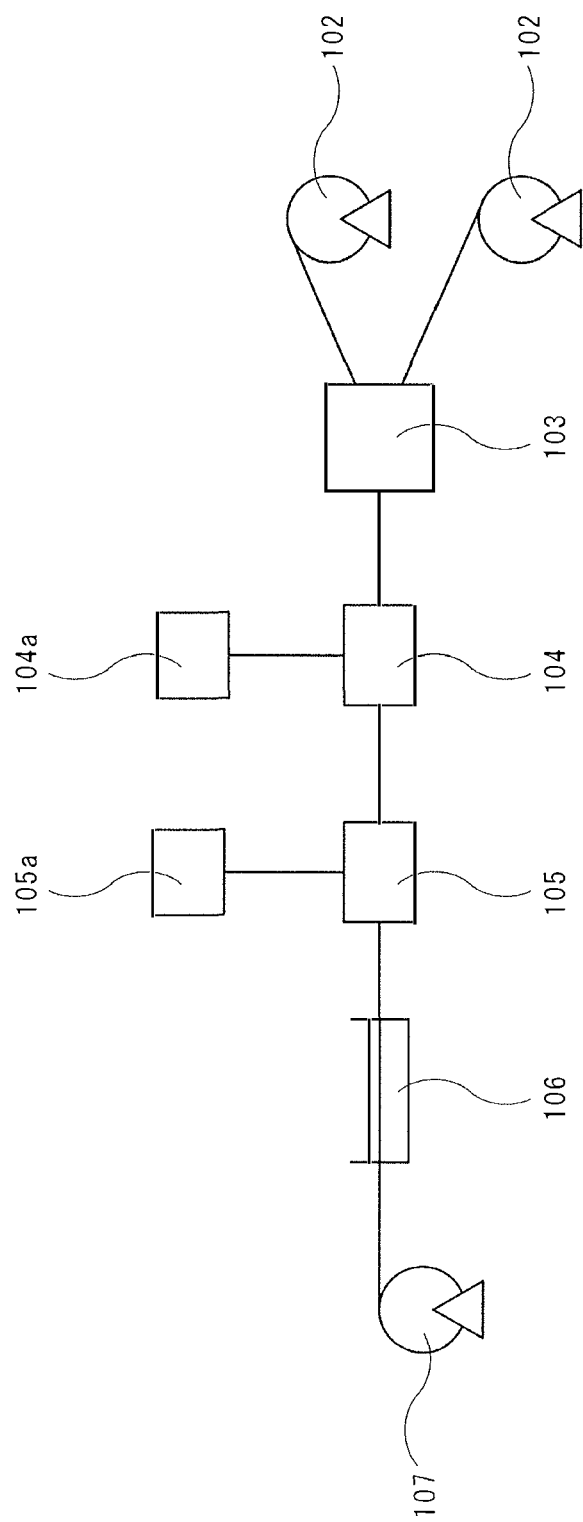
FIG. 3 is a schematic view illustrating a producing apparatus of the multi-core cable according to the present disclosure.

The production method of the multi-core cable can be performed by using a production apparatus for a multi-core cable illustrated in FIG. 3. The production apparatus for a multi-core cable mainly comprises: a plurality of core electric wire supply reels 102; a twisting unit 103; an inner sheath layer application unit 104; an outer sheath layer application unit 105; a cooling unit 106; and a cable winding reel 107.

(Twisting Step)

In the twisting step, the core electric wires for a multi-core cable 1 wound on the plurality of core electric wire supply reels 102 are respectively supplied to the twisting unit 103, where the core electric wires for a multi-core cable 1 is twisted to form the core 4.

(Sheath Layer Application Step)

In the sheath layer application step, the inner sheath layer application unit 104 extrudes a resin composition for the inner sheath layer, which is contained in a reservoir unit 104a, to an outer side of the core 4 formed in the twisting unit 103. The outer side of the core 4 is thus covered with the inner sheath layer 5a.

Subsequent to the covering with the inner sheath layer 5a, the outer sheath layer application unit 105 extrudes a resin composition for the outer sheath layer, which is contained in a reservoir unit 105a, to an outer periphery of the inner sheath layer 5a. The outer periphery of the inner sheath layer 5a is thus covered with the outer sheath layer 5b.

Subsequent to the covering with the outer sheath layer 5b, the core 4 is cooled in the cooling unit 106 to harden the sheath layer 5, thereby obtaining the multi-core cable 10. The multi-core cable 10 is wound by the cable winding reel 107.

It is preferred that the production method of the multi-core cable further comprises a step of crosslinking the resin component of the sheath layer 5 (crosslinking step). The crosslinking step may take place either prior to covering the conductor 4 with the composition forming the sheath layer 5, or subsequent to the covering (formation of the sheath layer 5).

The crosslinking can be caused by irradiating the composition with an ionizing radiation, similarly to the case of the insulating layer 3 of the core electric wire for a multi-core cable 1. The lower limit of the irradiation dose of the ionizing radiation is preferably 50 kGy, and more preferably 100 kGy. Meanwhile, the upper limit of the irradiation dose of the ionizing radiation is preferably 300 kGy and more preferably 240 kGy. In the case of the irradiation dose being less than the lower limit, a crosslinking reaction may not proceed sufficiently. To the contrary, in the case of the irradiation dose being greater than the upper limit, the resin component may be degraded.

<Advantages>

By virtue of having the core electric wire for a multi-core cable 1 of the aforementioned aspect as the electric wire constituting the core, the multi-core cable 10 for a multi-core cable is superior in flex resistance at low temperature.

Third Embodiment

Figure 4:
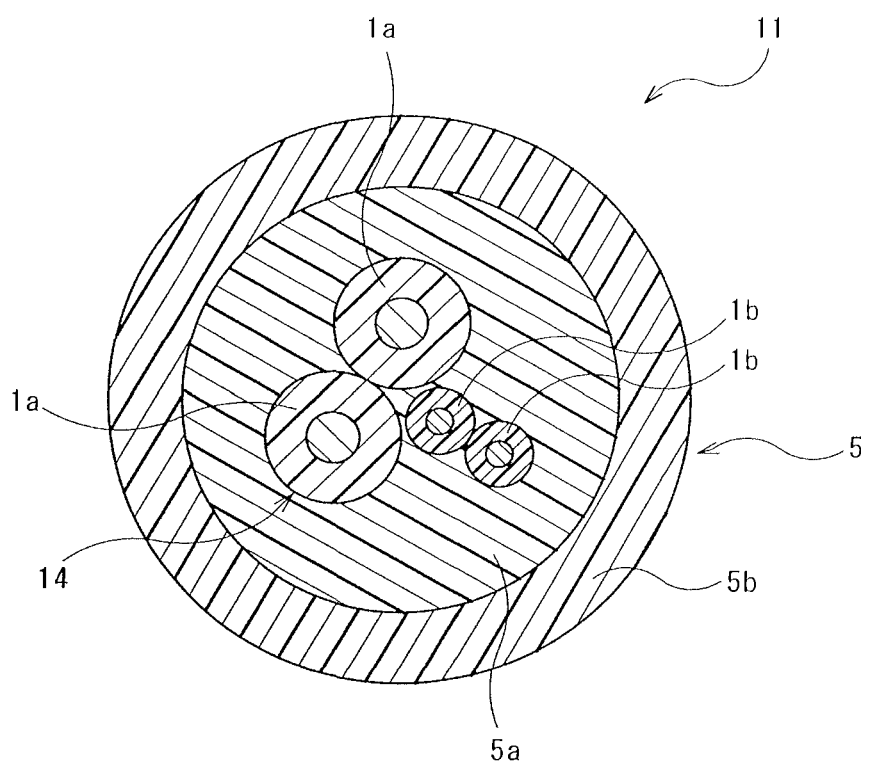
FIG. 4 is a schematic transverse cross sectional view illustrating a multi-core cable according to a third embodiment of the present disclosure.

A multi-core cable 11 illustrated in FIG. 4 comprises a core 14 obtained by twisting a plurality of the core electric wires 1 of FIG. 1, and a sheath layer 5 disposed around the core 14. Unlike the multi-core cable 10 of FIG. 2, the multi-core cable 11 is provided with the core 14 that is obtained by twisting the plurality of the core electric wires for a multi-core cable of different diameters. In addition to a use as a signal cable for an electric parking brake, the multi-core cable 11 may also be suitably used for transmitting an electric signal for controlling a behavior of an ABS. It is to be noted that the sheath layer 5 is identical to the sheath layer 5 of the multi-core cable 10 of FIG. 2 and is referred to by the same reference numeral, and thus explanation thereof is omitted.

<Core>

The core 14 is formed by twisting: two first core electric wires 1a of the same diameter; and two second core electric wires 1b of the same diameter, which is smaller than the diameter of the first core electric wires 1a. Specifically, the core 14 is formed by twisting the two first core electric wires 1a with a stranded core electric wire obtained by pair-twisting the two second core electric wires 1b. In the case of using the multi-core cable 11 as a signal cable for a parking brake and for an ABS, the stranded core electric wire obtained by twisting the second core electric wires 2b transmits a signal for the ABS.

The first core electric wire 1a is identical to the core electric wire for a multi-core cable 1 of FIG. 1. The second core electric wire 1b is the same in configuration except for a dimension of a transverse cross section, and may also be the same in material, as the first core electric wire 1a.

<Advantages>

The multi-core cable 11 is able to transmit not only an electric signal for an electric parking brake installed in a vehicle, but also an electric signal for an ABS.

Other Embodiments

Embodiments disclosed herein should be construed as exemplary and not limiting in all respects. The scope of the present disclosure is not limited to the configurations of the aforementioned embodiments but rather defined by the Claims, and intended to encompass any modification within the meaning and scope equivalent to the Claims.

The insulating layer of the core electric wire for a multi-core cable may be in a multilayer structure. In addition, the sheath layer of the multi-core cable may be either a single layer or in a multilayer structure with three or more layers.

The multi-core cable may also include as a core electric wire an electric wire other than the core electric wire for a multi-core cable of the present disclosure. However, in order to effectively provide the effects of the disclosure, it is preferred that every core electric wire is the core electric wire for a multi-core cable of the present disclosure. In addition, the number of the core electric wires in the multi-core cable is not particularly limited as long as the number is no less than 2, and may be 6, etc.

Furthermore, the core electric wire for a multi-core cable may also have a primer layer that is directly laminated onto the conductor. For the primer layer, a crosslinkable resin such as ethylene containing no metal hydroxide may be suitably used in a crosslinked state. Providing such a primer layer enables prevention of deterioration over time of peelability between the insulating layer and the conductor.

EXAMPLES

The core electric wire for a multi-core cable and the multi-core cable according to the aspects of the present disclosure are described more specifically by means of Examples; however, the present disclosure is not limited to the Production Examples described below.

Formation of Core Electric Wire

Core electric wires of Nos. 1 to 13 were obtained by preparing compositions for forming the insulating layer according to formulae shown in Table 1, followed by forming an insulating layer having an external diameter of 3 mm by extruding each of the compositions for forming the insulating layer to an outer periphery of a conductor (average diameter: 2.4 mm) that had been obtained by twisting 7 stranded element wires each obtained by twisting 72 annealed copper element wires each having an average diameter of 80 μm. The insulating layer was irradiated with an electron beam of 60 kGy to crosslink the resin component.

In Table 1, "EEA1" denotes "REXPEARL (registered trademark) A1100" available from Japan Polyethylene Corporation (ethyl acrylate content: 10% by mass); "EEA1" denotes "DPDJ-6182" available from NUC Corporation (ethyl acrylate content: 15% by mass); "EEA3" denotes "REXPEARL (registered trademark) A4250" available from Japan Polyethylene Corporation (ethyl acrylate content: 25% by mass); "EVA1" denotes "Novatec (registered trademark) LV342" available from Japan Polyethylene Corporation (vinyl acetate content: 10% by mass); "EVA2" denotes "SUNTEC (registered trademark) EM6145" available from Asahi Kasei Corporation (vinyl acetate content: 14% by mass); "EVA3" denotes "VZ732" available from Ube-Maruzen Polyethylene Co. Ltd (vinyl acetate content: 25% by mass); "EVA4" denotes "Evaflex (registered trademark) EV45LX" available from DUPONT-MITSUI POLYCHEMICALS CO., LTD. (vinyl acetate content: 46% by mass); "HDPE" (high-density polyethylene) denotes "HIZEX (registered trademark) 520 MB" available from Prime Polymer Co., Ltd.; and "LDPE1" (low-density polyethylene) denotes "Sumikasen (registered trademark) C215" available from Sumitomo Chemical Co., Ltd.

In addition, in Table 1, "fire retardant" is aluminum hydroxide ("HIGILITE (registered trademark) H-31" available from Showa Denko K.K.), and "antioxidant" is "IRGANOX (registered trademark) 1010" available from BASF Japan Ltd.

Formation of Multi-Core Cable

A second core electric wire was obtained by twisting two core electric wires each obtained by forming an insulating layer having an external diameter of 1.45 mm by extruding a crosslinked flame retardant polyolefin to an outer periphery of a conductor (average diameter: 0.72 mm) that had been obtained by twisting 60 copper alloy element wires each having an average diameter of 80 μm. Subsequently, two of the aforementioned core electric wires of the same type and the second core electric wire were twisted together to form a core, followed by covering the periphery of the core with a sheath layer by extrusion, to thereby obtain multi-core cables of Nos. 1 to 13. The sheath layer being formed had: an inner sheath layer comprising a crosslinked polyolefin as a principal component with a minimum thickness of 0.45 mm and an average external diameter of 7.4 mm; and an outer sheath layer comprising a flame retardant crosslinked polyurethane as a principal component with an average thickness of 0.5 mm and an average external diameter of 8.4 mm. It is to be noted that crosslinking of the resin component of the sheath layer was caused by irradiation with an electron beam of 180 kGy.

Linear Expansion Coefficient and Modulus of Elasticity

For each of the insulating layers of the core electric wires Nos. 1 to 13, a linear expansion coefficient C at from 25° C. to −35° C. was calculated from a dimension change of a thin plate with a temperature change, in accordance with a method of determination of dynamic mechanical properties defined in JIS-K7244-4 (1999), by using a viscoelasticity measuring apparatus (e.g., "DVA-220" manufactured by IT KEISOKU SEIGYO K.K.), in a pulling mode under conditions of: a temperature range of −100° C. to 200° C.; a rate of temperature rise of 5° C./min; a frequency of 10 Hz; and a skew of 0.05%. In addition, a modulus of elasticity E at −35° C. was obtained from a storage elastic modulus measured in accordance with a method of determination of dynamic mechanical properties defined in JIS-K7244-4 (1999), by using a viscoelasticity measuring apparatus ("DVA-220" manufactured by IT KEISOKU SEIGYO K.K.), in a pulling mode under conditions of: a temperature range of −100° C. to 200° C.; a rate of temperature rise of 5° C./min; a frequency of 10 Hz; and a skew of 0.05%. The results are shown in Table 1.

Flex Test

Figure 5:
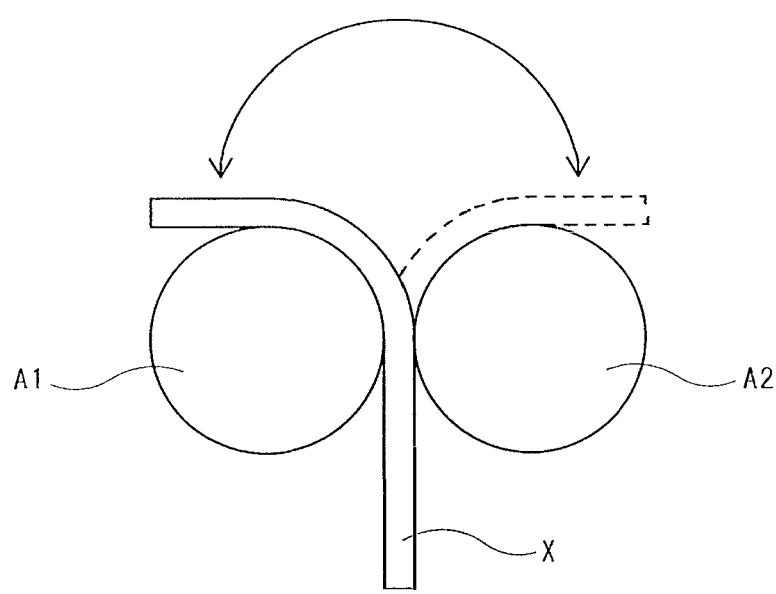
FIG. 5 is a schematic view illustrating a flex test in Examples.

As illustrated in FIG. 5, each of the multi-core cables X of Nos. 1 to 13 was placed perpendicularly between two mandrels A1 and A2 each having a diameter of 60 mm arranged horizontally and parallel to each other, and repeatedly bent from side to side at 90° in a horizontal direction such that an upper end thereof was in contact with an upper side of the mandrel A1 and then with an upper side of another mandrel A2. The test was conducted under conditions of: a downward load, of 2 kg applied to a lower end of the multi-core cable X; a temperature of −30° C.; and a bending rate of 60 times/min. During the test, the number of times of bending until a breakage of the multi-core cable (a state unable to carry a current) was counted. The results are shown in Table 1.

TABLE 1

| | | | No. 1 | No. 2 | No. 3 | No. 4 | No. 5 | No. 6 | No. 7 | No. 8 | No. 9 | No. 10 | No. 11 | No. 12 | No. 13 |
|---|---|---|---|---|---|---|---|---|---|---|---|---|---|---|---|
| Insulating Layer | EEA1 | parts by mass | 100 | — | — | — | — | — | — | — | — | — | — | — | — |
| | EEA2 | parts by mass | — | 100 | — | — | — | — | — | — | — | — | — | — | — |
| | EEA3 | parts by mass | — | — | 100 | — | — | — | — | — | — | — | — | — | — |
| | EVA1 | parts by mass | — | — | — | 100 | — | — | — | — | — | — | — | 100 | — |
| | EVA2 | parts by mass | — | — | — | — | 100 | — | — | — | — | — | — | — | 100 |
| | EVA3 | parts by mass | — | — | — | — | — | 100 | — | — | — | 70 | 50 | — | — |
| | EVA4 | parts by mass | — | — | — | — | — | — | 100 | — | — | — | — | — | — |
| | HDPE | parts by mass | — | — | — | — | — | — | — | 100 | — | — | — | — | — |
| | LDPE | parts by mass | — | — | — | — | — | — | — | — | 100 | 30 | 50 | — | — |
| | Fire Retardant | parts by mass | 70 | 70 | 70 | 70 | 70 | 70 | 70 | 70 | 70 | 70 | 70 | 40 | 130 |
| | Antioxidant | parts by mass | 2 | 2 | 2 | 2 | 2 | 2 | 2 | 2 | 2 | 2 | 2 | 2 | 2 |
| | Linear Expansion Coefficient C | $K^{-1}$ | 2.9E−04 | 2.0E−04 | 1.5E−04 | 3.0E−04 | 2.3E−04 | 2.2E−04 | 4.0E−05 | 4.8E−04 | 3.9E−04 | 2.4E−04 | 2.7E−04 | 2.7E−04 | 2.4E−04 |
| | Modulus of Elasticity E | MPa | 3200 | 2800 | 1900 | 3800 | 3800 | 3100 | 2800 | 4000 | 3900 | 3300 | 3500 | 3300 | 5000 |
| | C * E | | 0.93 | 0.56 | 0.29 | 1.10 | 0.87 | 0.37 | 0.11 | 1.9 | 1.5 | 0.79 | 0.95 | 0.89 | 1.2 |
| Multi-core Cable | Number of Times of Bending | | 7000 | 37000 | 45000 | 5000 | 11000 | 39000 | 50000 | 3000 | 4000 | 28000 | 8000 | 10000 | 4000 |

As shown n Table 1, the cables Nos. 2, 3, 5 to 7, 10, and 12, in which the mathematical product C*E was no greater than 0.9, were superior in the flex resistance at low temperature with a larger number of times of bending until a breakage at low temperature. On the other hand, the cables Nos. 1, 4, 8, 9, and 11, in which the mathematical product C*E was greater than 0.9, exhibited insufficient flex resistance at low temperature.

Figure 6:
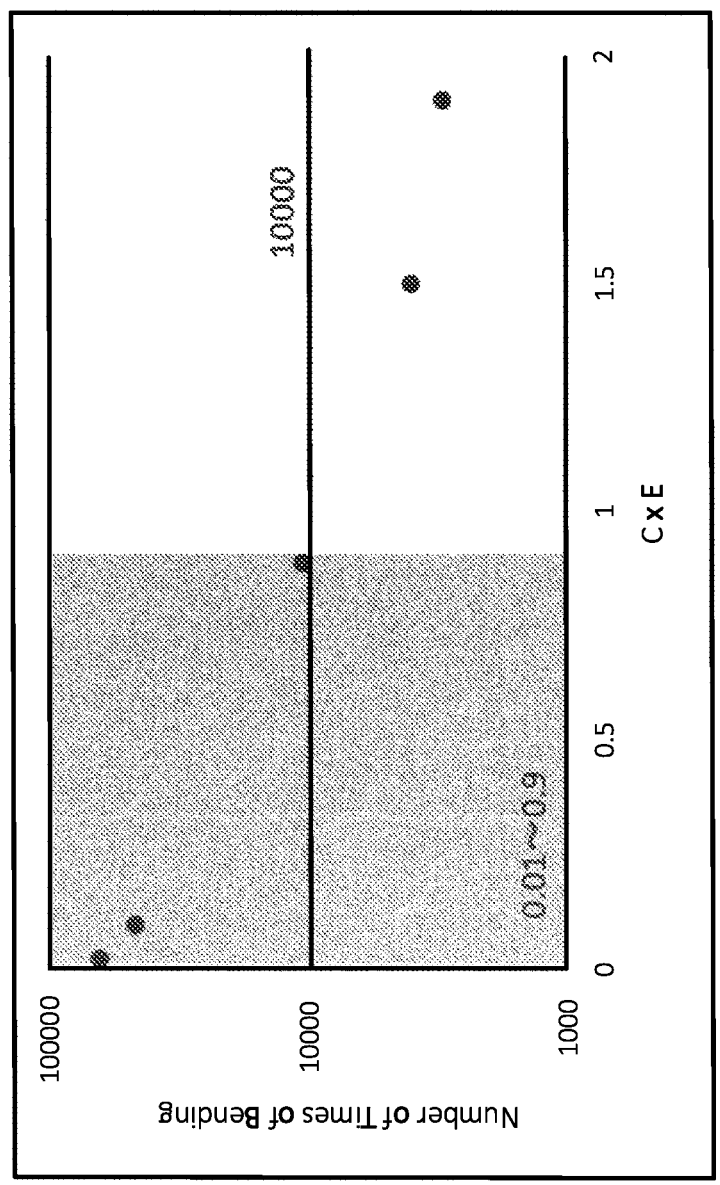
FIG. 6 is a graphical representation illustrating flex resistance in Examples.

Core electric wires of Nos. 14 to 16 were obtained by a production method similar to that of the core electric wires of Nos. 1 to 13 except that various types of polyethylene (PE) were each used as a principal component of the insulating layer as shown in Table 2 and FIG. 6.

In Table 2, "HDPE" (high-density polyethylene) denotes "HI-ZEX (registered trademark) 520 MB" available from Prime Polymer Co., Ltd., "LDPE1" (low-density polyethylene) denotes "Sumikasen C215" (registered trademark) available from Sumitomo Chemical Co., Ltd., "LDPE2" (low-density polyethylene) denotes "ENGAGE (registered trademark) 8540" available from The Dow Chemical Company, "VLDPE1" (very low-density polyethylene) denotes "ENGAGE (registered trademark) 8003" available from The Dow Chemical Company, and "VLDPE2" (very low-density polyethylene) denotes "TAFMER (registered trademark)" DF610 available from Mitsui Chemicals, Inc.

In addition, in Table 2, "fire retardant" is aluminum hydroxide ("HIGILITE (registered trademark) H-31" available from Showa Denko K.K.), and "antioxidant" is "IRGANOX (registered trademark) 1010" available from BASF Japan Ltd.

TABLE 2

| | | | No. 14 | No. 15 | No. 16 |
|---|---|---|---|---|---|
| Insulating Layer | HDPE | Parts by mass | — | — | — |
| | LDPE1 | Parts by mass | — | — | — |
| | LDPE2 | Parts by mass | 100 | — | — |
| | VLDPE1 | Parts by mass | — | 100 | — |
| | VLDPE2 | Parts by mass | — | — | 100 |
| | Fire Retardant | Parts by mass | 70 | 70 | 70 |
| | Antioxidant | Parts by mass | 2 | 2 | 2 |

TABLE 2-continued

|  |  |  | No. 14 | No. 15 | No. 16 |
|---|---|---|---|---|---|
|  | Linear Expansion Coefficient C | $K^{-1}$ | 3.0E−04 | 1.1E−04 | 1.0E−04 |
|  | Modulus of Elasticity E | Mpa | 3000 | 970 | 230 |
|  | C * E | — | 0.89 | 0.10 | 0.024 |
| Multi-core Cable | Number of Times of Bending | — | 10500 | 47000 | 64000 |

HDPE: HI-ZEX 520 MB (Prime Polymer Co., Ltd.)
LDPE1: Sumikasen C215 (Sumitomo Chemical Co., Ltd.)
LDPE2: ENGAGE 8540 (The Dow Chemical Company)
VLDPE1: ENGAGE 8003 (The Dow Chemical Company)
VLDPE2: TAFMER DF610 (Mitsui Chemicals, Inc.)
Fire retardant: HIGILITE H-31 (Showa Denko K.K.)
Antioxidant: IRGANOX 1010 (BASF Japan Ltd.)

As shown in Table 2 and FIG. 6, the cables of Nos. 14 to 16, in which the mathematical product C*E was no greater than 0.9, were superior in the flex resistance at low temperature with a larger number of times of bending until a breakage at low temperature.

Core electric wires of Nos. 17 and 18 were obtained by a production method similar to that of the core electric wires of Nos. 1 to 13 except that polyvinyl chloride (PVC) was used as a principal component of the insulating layer as shown in Table 3.

In Table 3, "PVC" (polyvinyl chloride) denotes "ZEST (registered trademark) 1300Z" available from Shin Daiichi Enbi K.K., "plasticizer" denotes "Elvaloy (registered trademark) HP4051" available from DUPONT-MITSUI POLYCHEMICALS CO., LTD., and "stabilizer" denotes "Adekastab (registered trademark) RUP-151" available from ADEKA CORPORATION.

TABLE 3

|  |  |  | No. 17 | No. 18 |
|---|---|---|---|---|
| Insulating Layer | PVC | Parts by mass | 100 | 100 |
|  | Plasticizer | Parts by mass | 50 | 100 |
|  | Stabilizer | Parts by mass | 3 | 3 |
|  | Linear Expansion Coefficient C | $K^{-1}$ | 1.8E−04 | 2.3E−05 |
|  | Modulus of Elasticity E | Mpa | 2400 | 2100 |
|  | C * E | — | 0.44 | 0.049 |
| Multi-core Cable | Number of Times of Bending | — | 12000 | 21000 |

PVC: ZEST1300Z (Shin Daiichi Enbi K.K.)
Plasticizer: Elvaloy HP4051 (DUPONT-MITSUI POLYCHEMICALS CO., LTD.)
Stabilizer: Adekastab RUP-151 (ADEKA CORPORATION)

As shown in Table 3, the cables of Nos. 17 and 18, in which the mathematical product C*E was no greater than 0.9, were superior in the flex resistance at low temperature with a larger number of times of bending until a breakage at low temperature.

INDUSTRIAL APPLICABILITY

The core electric wire for a multi-core cable according to an aspect of the present disclosure and a multi-core cable employing the same are superior in flex resistance at low temperature.

EXPLANATION OF THE REFERENCE SYMBOLS 1, 1a, 1b Core electric wire for a multi-core cable
2 Conductor
3 Insulating layer
4, 14 Core
5 Sheath layer
5a Inner sheath layer
5b Outer sheath layer
10, 11 Multi-core cable
102 Core electric wire supply reel
103 Twisting unit
104 Inner sheath layer application unit
104a, 105a Reservoir unit
105 Outer sheath layer application unit
106 Cooling unit
107 Cable winding reel
A1, A2 Mandrel
X Multi-core cable

The invention claimed is:

1. A core electric wire for a multi-core cable, comprising:
a conductor obtained by twisting element wires; and
an insulating layer that covers an outer periphery of the conductor, wherein a linear expansion coefficient C of the insulating layer at from 25° C. to −35° C. is no less than $1\times10^{-5}$ $K^{-1}$ and no greater than $2.5\times10^{-4}$ $K^{-1}$,
wherein the insulating layer is a single layer extruded.

2. The core electric wire according to claim 1, wherein an average area of the conductor in a transverse cross section is no less than 1.0 mm$^2$ and no greater than 3.0 mm$^2$.

3. The core electric wire according to claim 1, wherein an average diameter of each of the element wires in the conductor is no less than 40 μm and no greater than 100 μm, and
a number of the element wires is no less than 196 and no greater than 2,450.

4. The core electric wire according to claim 1, wherein the conductor is obtained by twisting a plurality of stranded element wires, and
the stranded element wire is obtained by twisting subsets of the element wires.

5. A multi-core cable comprising: a core obtained by twisting core electric wires; and a sheath layer disposed around the core, wherein
at least one of the core electric wires is the core electric wire according to claim 1.

6. The multi-core cable according to claim 5, wherein at least one of the core electric wires is obtained by twisting subsets of the core electric wires.

7. The multi-core cable according to claim 5 which is suitable for being connected to an anti-lock brake system and/or an electric parking brake.

8. A core electric wire for a multi-core cable, comprising:
a conductor obtained by twisting element wires; and
an insulating layer that covers an outer periphery of the conductor, wherein the insulating layer is a single layer extruded, and a modulus of elasticity E of the insulating layer at −35° C. is no less than 1,000 MPa and no greater than 3,500 MPa.

9. The core electric wire according to claim 8, wherein an average area of the conductor in a transverse cross section is no less than 1.0 mm² and no greater than 3.0 mm².

10. The core electric wire according to claim 8, wherein
an average diameter of each of the element wires in the conductor is no less than 40 μm and no greater than 100 μm, and number of the element wires is no less than 196 and no greater than 2,450.

11. The core electric wire according to claim 8, wherein
the conductor is obtained by twisting a plurality of stranded element wires, and the stranded element wire is obtained by twisting subsets of the element wires.

12. A multi-core cable comprising: a core obtained by twisting core electric wires; and a sheath layer disposed around the core, wherein
at least one of the core electric wires is the core electric wire according to claim 8.

13. The multi-core cable according to claim 12, wherein at least one of the core electric wires is obtained by twisting subsets of the core electric wires.

14. The multi-core cable according to claim 12 which is suitable for being connected to an anti-lock brake system and/or an electric parking brake.

15. A core electric wire for a multi-core cable, comprising:
a conductor obtained by twisting element wires; and an insulating layer that covers an outer periphery of the conductor, wherein a number of times of bending of the multi-core cable, counted according to a flex test, is no less than 10,000 before breakage, the flex test comprising:
placing the multi-core cable perpendicularly between a first mandrel and a second mandrel each having a diameter of 60 mm arranged horizontally and parallel to each other;

repeatedly bending the multi-core cable from side to side at 900 in a horizontal direction such that an upper end thereof is in contact with an upper side of the first mandrel and then in contact with an upper side of the second mandrel; and counting the number of times of bending until a breakage of the multi-core cable (a state unable to carry a current), under a test condition involving: a downward load of 2 kg applied to a lower end of the multi-core cable; a temperature of −30° C.; and a bending rate of 60 times/min.

16. The core electric wire according to claim 15, wherein an average area of the conductor in a transverse cross section is no less than 1.0 mm² and no greater than 3.0 mm².

17. The core electric wire according to claim 15, wherein an average diameter of each of the element wires in the conductor is no less than 40 μm and no greater than 100 μm, and a number of the element wires is no less than 196 and no greater than 2,450.

18. The core electric wire according to claim 15, wherein
the conductor is obtained by twisting a plurality of stranded element wires, and the stranded element wire is obtained by twisting subsets of the element wires.

19. A multi-core cable comprising: a core obtained by twisting core electric wires; and a sheath layer disposed around the core, wherein
at least one of the core electric wires is the core electric wire according to claim 15.

20. The multi-core cable according to claim 19, wherein at least one of the core electric wires is obtained by twisting subsets of the core electric wires.

21. The multi-core cable according to claim 19 which is suitable for being connected to an anti-lock brake system and/or an electric parking brake.

* * * * *